(12) United States Patent
Matsumoto et al.

(10) Patent No.: US 10,252,786 B2
(45) Date of Patent: Apr. 9, 2019

(54) EXHAUST GAS PROCESSING APPARATUS

(71) Applicant: FUJI ELECTRIC CO., LTD., Kanagawa (JP)

(72) Inventors: Nanae Matsumoto, Hino (JP); Yoshiaki Enami, Hino (JP); Kuniyuki Takahashi, Hino (JP); Takashi Inui, Hachioji (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 0 days.

(21) Appl. No.: 15/928,103

(22) Filed: Mar. 22, 2018

(65) Prior Publication Data
US 2018/0208289 A1 Jul. 26, 2018

Related U.S. Application Data

(60) Division of application No. 15/417,244, filed on Jan. 27, 2017, now Pat. No. 9,957,029, which is a
(Continued)

(30) Foreign Application Priority Data

Feb. 24, 2015 (JP) ................................ 2015-034389

(51) Int. Cl.
*B01D 53/18* (2006.01)
*B01D 53/48* (2006.01)
(Continued)

(52) U.S. Cl.
CPC ............. *B63H 21/32* (2013.01); *B01D 53/18* (2013.01); *B01D 53/48* (2013.01); *B01D 53/50* (2013.01);
(Continued)

(58) Field of Classification Search
CPC ........ B01D 53/48; B01D 53/78; B63H 21/32; F01N 3/04
See application file for complete search history.

(56) References Cited

U.S. PATENT DOCUMENTS 5,376,166 A * 12/1994 Hoffmann ............... B01D 47/06
95/216
2015/0174527 A1 6/2015 Takahashi et al.

FOREIGN PATENT DOCUMENTS

AT 394144 B 2/1992
CN 104053488 A 9/2014
(Continued)

OTHER PUBLICATIONS

Notice of reasons for refusal for Japanese Patent Application No. 2015-034389 issued by the JPO dated Mar. 1, 2016.
(Continued)

*Primary Examiner* — Cabrena Holecek

(57) ABSTRACT

An exhaust gas processing apparatus that processes exhaust gas, including a reaction tower that includes an internal space extending in a height direction; a trunk tube that extends in the height direction in the internal space of the reaction tower and transports a liquid; and a plurality of branch tubes that are provided extending from an outer side surface of the trunk tube toward an inner side surface of the reaction tower, each include an ejecting section that ejects the liquid supplied from the trunk tube, and are provided at positions at different heights. Ejection regions of the liquid where the liquid is ejected from the respective ejecting sections of branch tubes that are adjacent in the height direction include a region in which the ejection regions partially overlap in an overhead view as seen from the height direction.

15 Claims, 13 Drawing Sheets

Related U.S. Application Data continuation of application No. PCT/JP2016/050155, filed on Jan. 5, 2016.

(51) Int. Cl.
  *B01D 53/50* (2006.01)
  *B01D 53/78* (2006.01)
  *B63H 21/32* (2006.01)
  *F01N 3/04* (2006.01)
  *F01N 3/08* (2006.01)

(52) U.S. Cl.
  CPC ............... *B01D 53/78* (2013.01); *F01N 3/04* (2013.01); *F01N 3/08* (2013.01); *B01D 2258/0283* (2013.01); *B01D 2259/4566* (2013.01)

(56) References Cited

FOREIGN PATENT DOCUMENTS

| DE | 19615270 | A1 |   | 10/1997 |
|----|----------|----|---|---------|
| JP | S46-005099 | B1 |   | 2/1971 |
| JP | S47-013231 | B1 |   | 4/1972 |
| JP | S47-013232 | B1 |   | 4/1972 |
| JP | S47-050703 | B1 |   | 12/1972 |
| JP | S50-105540 | A |   | 8/1975 |
| JP | S51-099667 | A |   | 9/1976 |
| JP | S52-096973 | A |   | 8/1977 |
| JP | S56-028169 | B2 |   | 6/1981 |
| JP | S59-049823 | A |   | 3/1984 |
| JP | 63225504 | A | * | 9/1988 |
| JP | S63-225504 | A |   | 9/1988 |
| JP | H07-171337 | A |   | 7/1995 |
| JP | H09-049627 | A |   | 2/1997 |
| JP | 09173764 | A | * | 7/1997 |
| JP | H09-173764 | A |   | 7/1997 |
| JP | 2012-192361 | A |   | 10/2012 |
| JP | 2012192361 | A | * | 10/2012 |
| WO | 2013/107816 | A1 |   | 7/2013 |
| WO | 2014/098081 | A1 |   | 6/2014 |

OTHER PUBLICATIONS

International Search Report for International Patent Application No. PCT/JP2016/050155, issued by the Japan Patent Office dated Mar. 8, 2016.

Extended European Search Report for European Patent Application No. 16755030.0, issued by the European Patent Office dated Aug. 16, 2017.

Notice of First Office Action for Patent Application No. 201680002135.9, issued by the State Intellectual Property Office of the People's Republic of China (Chinese Patent Office) dated Aug. 29, 2017.

* cited by examiner

EXHAUST GAS PROCESSING APPARATUS

CROSS-REFERENCE TO RELATED APPLICATIONS

This application is a divisional of U.S. patent application Ser. No. 15/417,244, filed on Jan. 27, 2017, which is a continuation of International Patent Application No. PCT/JP2016/050155, filed on Jan. 5, 2016, which claims priority to Japanese Patent Application No. 2015-034389, filed on Feb. 24, 2015, all of which are hereby incorporated by reference in their entirety.

BACKGROUND

1. Technical Field

The present invention relates to an exhaust gas processing apparatus.

2. Related Art

A conventional exhaust gas processing apparatus is known that removes harmful substances in exhaust gas by passing the exhaust gas from a bottom portion to a top portion of an absorption tower into which sea water or the like is sprayed, as shown in Patent Document 1, for example. Inside the absorption tower, the exhaust gas is moved to the top portion while being circulated in a spiral, thereby increasing the time during which the exhaust gas is in contact with the sea water or the like.

Patent Document 1: Japanese Patent Application Publication No. 2014-117685

Inside the absorption tower, the exhaust gas is preferably prevented from progressing straight up in the height direction, so that it is possible to increase the time during which the exhaust gas is in contact with the sea water or the like.

SUMMARY

According to a first aspect of the present invention, provided is an exhaust gas processing apparatus that processes exhaust gas, comprising a reaction tower, a trunk tube, and a plurality of branch tubes. The reaction tower may include an internal space extending in a height direction from a bottom portion side where the exhaust gas is introduced to a top portion side where the exhaust gas is emitted. The trunk tube may extend in the height direction in the internal space of the reaction tower. The trunk tube may transport a liquid. The plurality of branch tubes that may be provided extending from an outer side surface of the trunk tube toward an inner side surface of the reaction tower. Each branch tube may include an ejecting section that ejects the liquid supplied from the trunk tube. The branch tubes may be provided at positions at different heights. Ejection regions of the liquid where the liquid is ejected from the respective ejecting sections of branch tubes that are adjacent in the height direction include a region in which the ejection regions partially overlap in an overhead view as seen from the height direction.

In an overhead view of the plurality of branch tubes as seen from the height direction, the largest angle among the angles formed by adjacent branch tubes may be less than 60 degrees. In the overhead view, the plurality of branch tubes may be provided in a manner to surround a circumference of the trunk tube at least once.

A cross-sectional area of a flow path of the liquid in the trunk tube in the top portion of the reaction tower where the exhaust gas is emitted may be less than a cross-sectional area of a flow path of the liquid in the trunk tube in a bottom portion of the reaction tower where the exhaust gas is introduced. Intervals between the plurality of branch tubes in the height direction may be smaller in a top portion of the reaction tower where the exhaust gas is emitted than in a bottom portion of the reaction tower where the exhaust gas is introduced Among the plurality of branch tubes, angles formed between branch tubes that are adjacent in the height direction may be smaller in a top portion of the reaction tower where the exhaust gas is emitted than in a bottom portion of the reaction tower where the exhaust gas is introduced. Intervals between the plurality of branch tubes in the height direction may be smaller in a top portion of the reaction tower where the exhaust gas is emitted than in a bottom portion of the reaction tower where the exhaust gas is introduced.

The plurality of branch tubes may be provided in a spiral having a rotational direction that is the same as a circulation direction of the exhaust gas introduced to the reaction tower. The plurality of branch tubes may be provided in a spiral having a rotational direction that is the opposite of a circulation direction of the exhaust gas introduced to the reaction tower. The plurality of branch tubes may be provided in a manner to not overlap in the overhead view.

The ejecting sections may be provided in the branch tubes and the particle diameters of the liquid particles ejected by the ejecting sections may be smaller in the top portion of the reaction tower where the exhaust gas is emitted than in the bottom portion of the reaction tower where the exhaust gas is introduced. The number of particles in the ejected liquid per unit volume may be greater in the top portion of the reaction tower where the exhaust gas is emitted than in the bottom portion of the reaction tower where the exhaust gas is introduced.

The exhaust gas processing apparatus may be an exhaust gas processing apparatus used in a ship. The ship may include a plurality of floors in a height direction, the reaction tower may be provided across two or more floors of the ship, and a cross-sectional area of the internal space of the reaction tower in a plane perpendicular to the height direction may differ according to the floor of the ship. Extension lengths of the branch tubes provided in respective floors may differ according to the cross-sectional area of the internal space.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
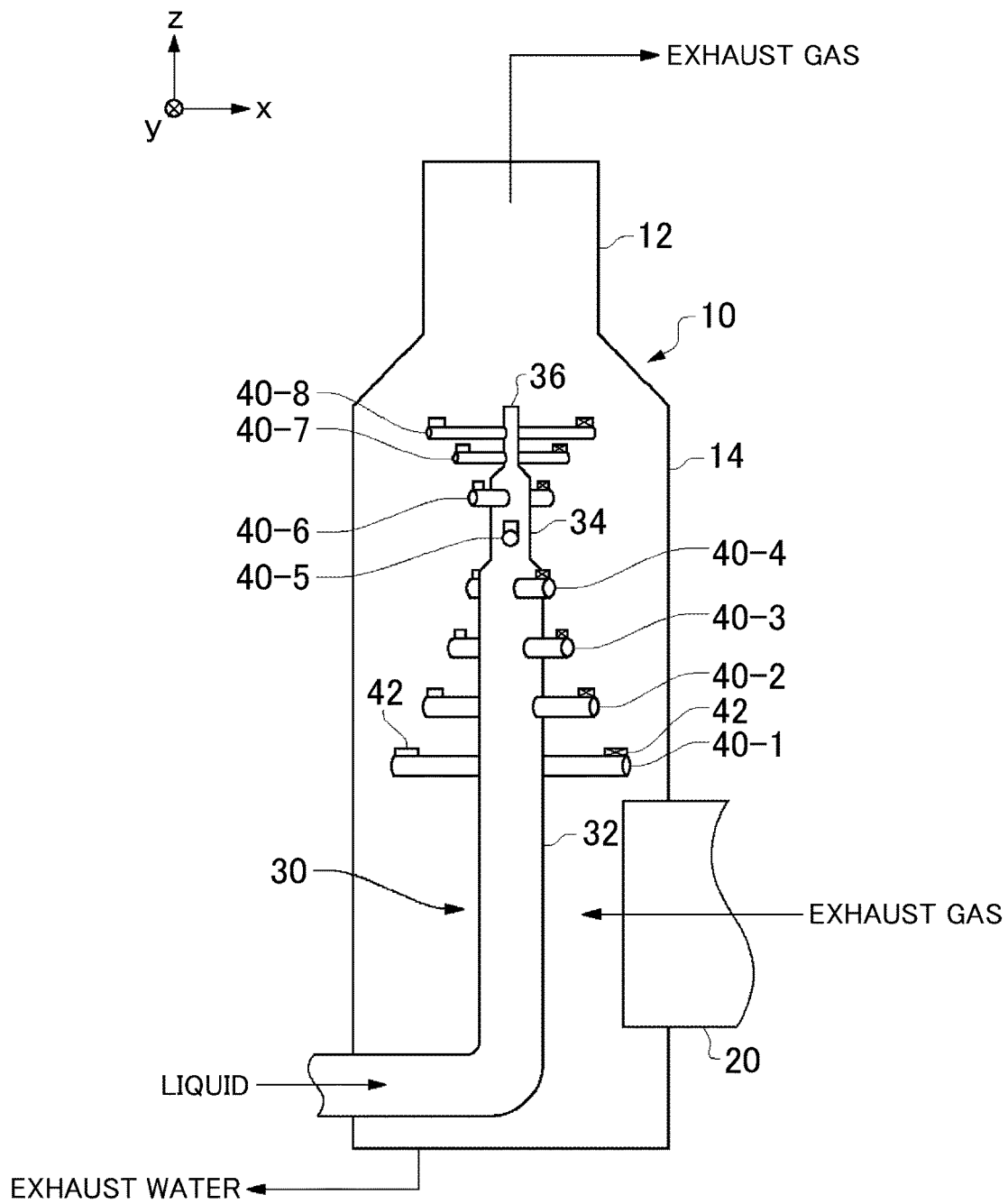
FIG. 1 shows an exemplary structure of an exhaust gas processing apparatus 100 according to an embodiment.

FIG. 1 shows an exemplary structure of an exhaust gas processing apparatus 100 according to an embodiment. The exhaust gas processing apparatus 100 removes harmful substances such as sulfur components that are included in exhaust gas emitted from an engine of a ship or the like. The exhaust gas processing apparatus 100 in the present example includes a reaction tower 10, an exhaust gas introducing section 20, a trunk tube 30, and a plurality of branch tubes 40.

The reaction tower 10 includes an internal space that extends in a height direction. In the present example, the height direction refers to a direction extending from the bottom portion side where the exhaust gas is introduced into the reaction tower 10 toward the top portion side where the exhaust gas is emitted. A z-axis direction shown in FIG. 1 corresponds to the height direction. The z-axis direction is perpendicular to the floor of the ship or parallel to the direction of gravity, for example. The exhaust gas introducing section 20 introduces the exhaust gas into the internal space of the reaction tower 10. The exhaust gas introducing section 20 in the present example causes the exhaust gas to be introduced into the reaction tower 10 near the bottom surface of the reaction tower 10. The exhaust gas introducing section 20 causes the exhaust gas to be introduced into the reaction tower 10 such that the exhaust gas circulates in a spiral along the side surface of the reaction tower 10.

The reaction tower 10 in the present example includes an absorbing section 14 that absorbs harmful substances in the exhaust gas by spraying a liquid therein, and an exhaust section 12 into which the liquid is not sprayed. The exhaust section 12 emits the exhaust gas to the outside after the exhaust gas has passed through the absorbing section 14. By providing the exhaust section 12 into which the liquid is not sprayed on the exhaust side, it becomes more difficult for the liquid to be emitted from the exhaust gas processing apparatus 100. The cross-sectional area of the internal space of the exhaust section 12 in the x-y plane may be less than the area of the internal space of the absorbing section 14. The x-y plane in the present example is a plane normal to the z axis.

The trunk tube 30 is provided extending in the height direction, i.e. the z-axis direction, in the internal space of the reaction tower 10. The trunk tube 30 has a liquid flow path therein, for example, and transports the liquid in the height direction. The trunk tube 30 may be introduced into the reaction tower 10 from a side surface of the reaction tower 10 near the bottom surface of the absorbing section 14, and may extend to a region near the top end of the absorbing section 14. If the exhaust gas processing apparatus 100 is provided in a ship, the liquid introduced to the trunk tube 30 may be sea water, lake water, river water, processed water that has been alkalinized, or the like.

The cross-sectional area of the liquid flow path in the trunk tube 30 may be different depending on the position in the height direction. The cross-sectional area of the liquid flow path in the top portion of the trunk tube 30 may be less than the cross-sectional area of the liquid flow path in the bottom portion of the trunk tube 30. In this Specification, the bottom portion refers to the portion on the side where the exhaust gas is introduced to the reaction tower 10, and the top portion refers to the portion on the side where the exhaust gas is emitted from the reaction tower 10.

The trunk tube 30 in the present example includes a bottom portion 32, a middle portion 34, and a top portion 36 in the stated order from the bottom portion side. The cross-sectional area of the liquid flow path in the top portion 36, which is farthest on the top portion side, is less than the cross-sectional area of the liquid flow path in the bottom portion 32, which is farthest on the bottom portion side. In the present example, the cross-sectional area of the liquid pathway in the middle portion 34 is less than the cross-sectional area of the liquid pathway in the bottom portion 32.

The cross-sectional area of the liquid flow path in the top portion 36 is even less than the cross-sectional area of the liquid flow path in the middle portion 34. The amount of liquid that flows through the trunk tube 30 becomes smaller as the liquid progresses to the top portion, but with the structure described above, it is possible to reduce the decrease in the liquid pressure that accompanies the decrease in flow rate, thereby preventing a decrease in the ejection speed of the liquid. In this Specification, if no specific definition is given, the amount of liquid refers to a value per unit time.

The plurality of branch tubes 40 are provided extending from the outer side surface of the trunk tube 30 toward the inner side surface of the reaction tower 10. The branch tubes 40 are provided extending within the x-y plane, for example. Each branch tube 40 may extend to a region near the inner side surface of the reaction tower 10. The radius of the reaction tower 10 may be from 0.3 m to several meters, and the space between the tip of a branch tube 40 and the inner side surface of the reaction tower 10 may be from 10 cm to tens of centimeters.

A flow path through which the liquid flows is formed branching from the trunk tube 30 inside each branch tube 40. Each branch tube 40 includes an ejecting section 42 that receives the liquid from this flow path and ejects the liquid into the internal space of the reaction tower 10. Each ejecting section 42 may eject the liquid as a mist. Each branch tube 40 may include a plurality of ejecting sections 42. Each ejecting section 42 may eject the liquid in a direction that is perpendicular to the height direction of the reaction tower 10. In FIG. 1, ejection openings may be provided on the surfaces of the ejecting sections 42 marked with an x.

In the present example, the branch tubes 40 extend in opposite directions with the trunk tube 30 therebetween. In the present example, a set of branch tubes 40 opposite each other is referred to as one branch tube 40. The ejecting sections 42 respectively provided in branch tubes 40 opposite each other eject the liquid in opposite directions. Among the plurality of branch tubes 40, at least two branch tubes 40 are provided at positions at different heights. In the present example, eight branch tubes 40-1, 40-2, . . . , 40-8 are provided at positions at different heights. The liquid ejection regions where the liquid is ejected from each ejecting section 42 provided in a plurality of branch tubes 40 that are adjacent in the height direction partially overlap in an overhead view as seen from the height direction.

The liquid ejected from the ejecting sections 42 contacts the exhaust gas passing through the inside of the reaction tower 10 and absorbs the harmful substances included in the exhaust gas. The liquid used to absorb the harmful substances is collected in the bottom portion of the reaction tower 10 and emitted to the outside.

Figure 2:
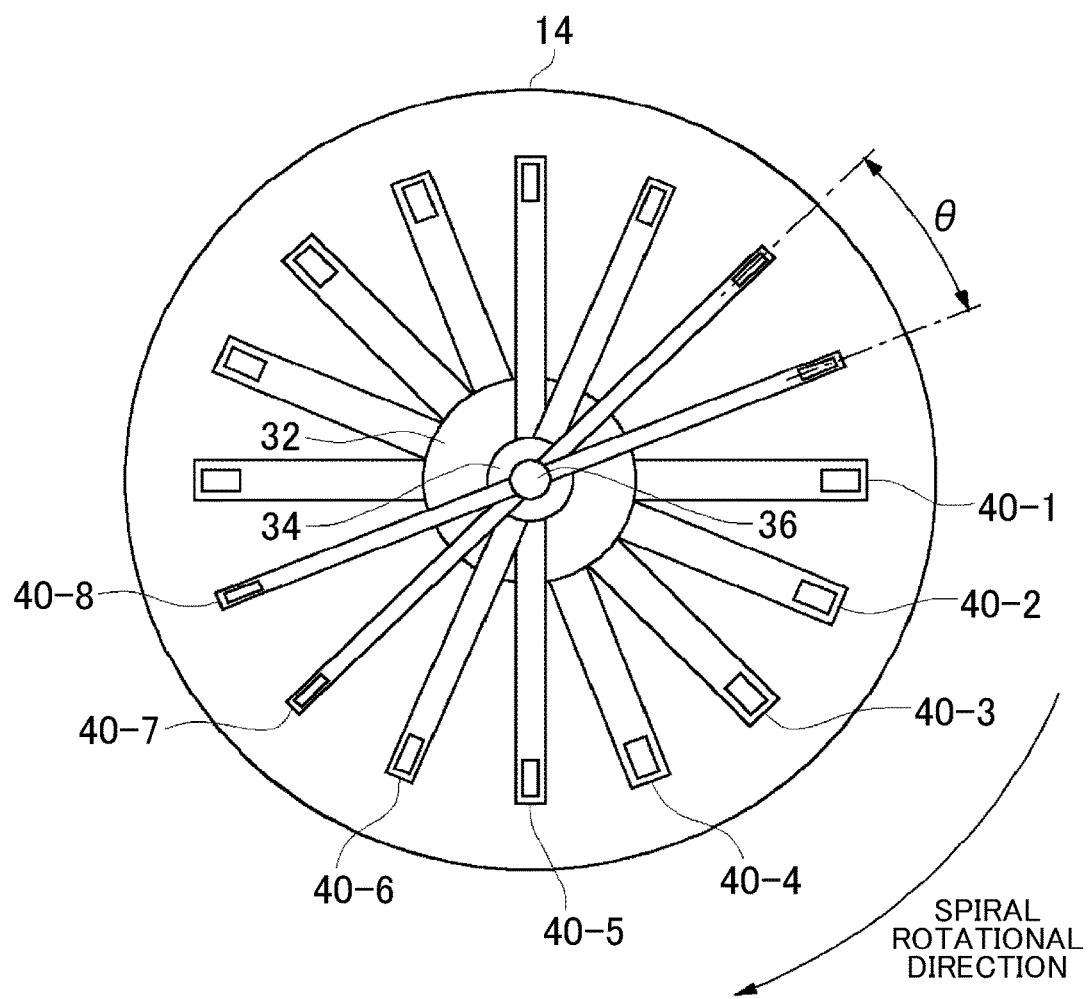
FIG. 2 shows an overhead view of the plurality of branch tubes 40 as seen from the height direction.

FIG. 2 shows an overhead view of the plurality of branch tubes 40 as seen from the height direction. As described above, each branch tube 40 is arranged such that the respective ejection regions of the ejecting sections 42 provided in branch tubes 40 that are adjacent in the height direction overlap. For example, by making the angle formed between branch tubes 40 that are adjacent in the height direction small, it is possible to make adjacent ejection regions overlap. As an example, in the overhead view of the plurality of branch tubes 40 as seen from the height direction, the largest angle among the angles formed by branch tubes 40 that are adjacent in the height direction is less than 60 degrees. As an example, in the example of FIG. 2, the angle θ formed by each branch tube 40 and another adjacent branch tube 40 is 22.5 degrees.

Figure 3:
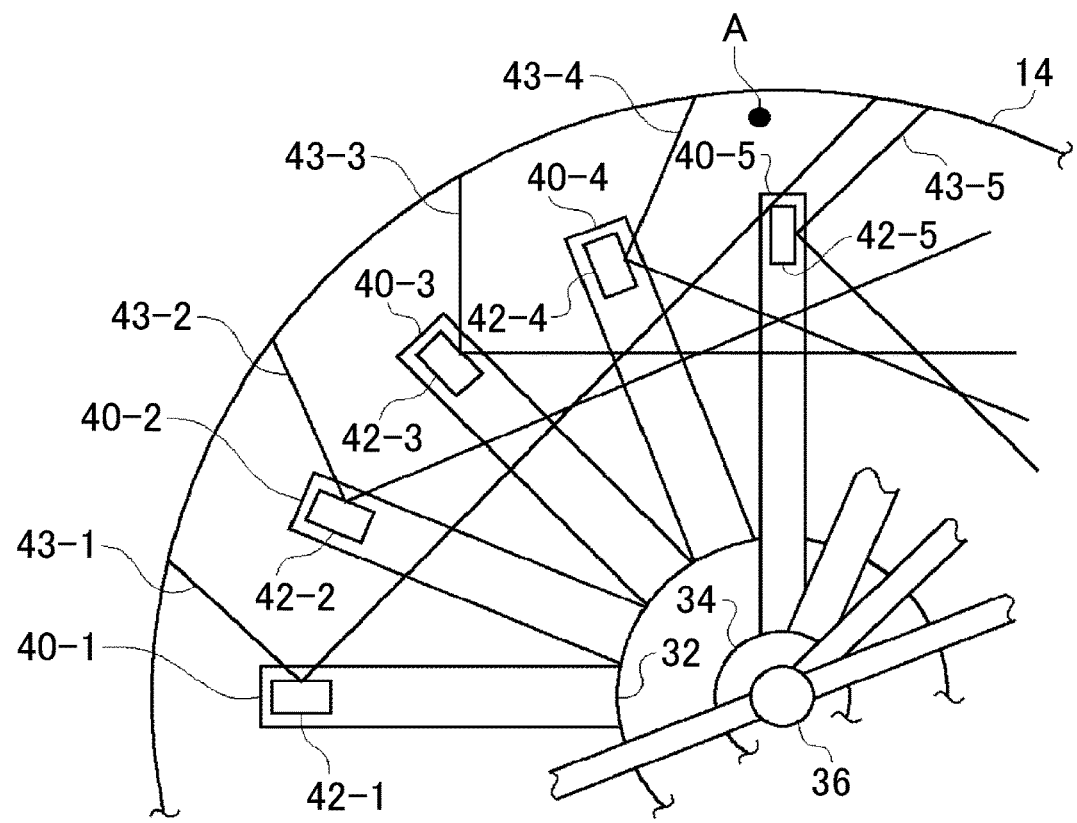
FIG. 3 shows an example of ejection regions 43 of respective ejecting sections 42.

FIG. 3 shows an example of ejection regions 43-1, 43-2, 43-3, 43-4, 43-5 (collectively 43) of respective ejecting sections 42. FIG. 3 is an enlarged view of the ejection regions 43 of the branch tubes 40-1 to 40-5, but the ejection regions 43 of the other branch tubes 40 are the same. As described above, the liquid ejection regions 43 where the liquid is ejected from each ejecting section 42-1, 42-2, 42-3, 42-4, 42-5 (collectively 42) provided in a plurality of branch tubes 40 that are adjacent in the height direction have partially overlapping regions in the overhead view as seen from the height direction. In FIG. 3, the borders between ranges of the ejection regions 43 are shown by solid lines.

As an example, the ejection region 43-3 of the ejecting section 42-3 and the ejection region 43-4 of the ejecting section 42-4, which are adjacent to each other, overlap at least in the region A but do not completely overlap. By making all of the ejection regions 43 partially overlap with the adjacent ejection regions 43, the spaces between the ejection regions 43 in the overhead view become small. Accordingly, compared to a case where each of the liquid ejection regions 43 that are adjacent in the height direction do not overlap, it is possible to eliminate the spaces between each of the liquid ejection regions 43 that are adjacent in the height direction in the present example.

In particular, it is possible to eliminate the spaces between the ejection regions 43 near the side surface of the reaction tower 10 where the majority of the exhaust gas moves during circulation. Therefore, the exhaust gas can be prevented from moving linearly in the height direction without being circulated, and the time during which the exhaust gas passes through the absorbing section 14 can be increased. In particular, an engine of a ship or the like experiences fluctuation in the flow rate of the exhaust gas being emitted, according to the demanded load or the like. In this case as well, by eliminating the spaces between the respective liquid ejection regions 43 that are adjacent in the height direction, the exhaust gas can be prevented from moving linearly in the height direction without being circulated, and the time during which the exhaust gas passes through the absorbing section 14 can be increased.

The regions near the trunk tube 30 are also preferably covered as much as possible by the ejection regions 43. Each branch tube 40 may be provided with an ejecting section 42 arranged near the trunk tube 30 and an ejecting section 42 arranged near the side surface of the reaction tower 10.

In each branch tube 40, the ejecting section 42 arranged near the side surface of the reaction tower 10 preferably has an ejection region 43 that partially overlaps with the ejection regions 43 of the ejecting sections 42 that are adjacent in the height direction. The liquid ejected by the ejecting sections 42 arranged near the side surface of the reaction tower 10 preferably reaches the side surface of the reaction tower 10.

For each ejecting section 42 arranged near the trunk tube 30 as well, the ejection region 43 preferably partially overlaps with the ejection regions 43 of the ejecting sections 42 that are adjacent in the height direction. The liquid ejected by the ejecting sections 42 arranged near the trunk tube 30 preferably reaches the side surface of the trunk tube 30. Furthermore, in an overhead view, the entire region of the internal space of the reaction tower 10 is preferably covered by at least one ejection region 43.

Furthermore, each ejection region 43 may partially overlap with two or more ejection regions 43. For example, in the example shown in FIG. 3, the ejection region 43-1 partially overlaps with at least the three ejection regions 43-2, 43-3, and 43-4. Although not shown in FIG. 3, the ejection region 43-1 also partially overlaps with the ejection region of the ejecting section 42 of the branch tube 40-8 and the like. Each ejection region 43 may partially overlap with three of more ejection regions 43, or may partially overlap with four or more ejection regions 43.

At least half of the area of each ejection region 43 may overlap with an adjacent ejection region 43, or at least one fourth of the area of each ejection region 43 may overlap with an adjacent ejection region 43. The ejection region 43 of each ejecting section 42 may be a region including the adjacent ejecting sections 42 in the overhead view.

In this way, the ejection regions 43 of the liquid ejected from the respective ejecting sections 42 provided in the plurality of branch tubes 40 that are adjacent in the height direction include regions that partially overlap in the overhead view as seen from the height direction. Accordingly, compared to a case where liquid ejection regions 43 that are adjacent in the height direction do not overlap, it is possible to eliminate the spaces between the liquid ejection regions 43 that are adjacent in the height direction in the present example. Therefore, it is possible to prevent the liquid from rising along with the exhaust gas. As a result, it is possible to prevent the liquid that has absorbed the harmful substances from being emitted to the outside along with the exhaust gas. Accordingly, a structure for preventing the liquid from being emitted does not need to be provided separately or this structure can be made smaller, thereby enabling miniaturization of the exhaust gas processing apparatus 100.

Furthermore, by arranging the branch tubes 40 as described above, it is possible to arrange the branch tubes 40 around the trunk tube 30 uniformly in the overhead view. Therefore, the branch tubes 40 themselves can prevent the exhaust gas from progressing linearly in the height direction without being circulated, and it is possible to increase the time during which the exhaust gas passes through the absorbing section 14. Accordingly, it is possible to efficiently remove harmful substances from the exhaust gas.

Since the circulation of the exhaust gas is not impeded by the branch tubes 40 themselves, the liquid easily collides with the side surface of the reaction tower 10 along with the flow of the exhaust gas. Since the branch tubes 40 surround the trunk tube 30 uniformly in the overhead view, the liquid can be prevented from rising along with the exhaust gas. Therefore, the liquid that has absorbed the harmful substances can be prevented from being emitted to the outside along with the exhaust gas. Accordingly, a structure for preventing the liquid from being emitted does not need to be provided separately or this structure can be made smaller, thereby enabling miniaturization of the exhaust gas processing apparatus 100.

When emission standards for harmful substances in ships or the like are strengthened, there is an idea of newly mounting an exhaust gas processing apparatus in existing equipment of a ship or the like, or of replacing the exhaust gas processing apparatus. Since the exhaust gas processing apparatus 100 of the present example can easily be miniaturized, the exhaust gas processing apparatus 100 can easily be installed in existing equipment of a ship or the like.

Among the angles formed between adjacent branch tubes 40, the largest angle may be less than 45 degrees. In this case, the exhaust gas component rotating in the x-y plane becomes larger more easily than the exhaust gas component progressing linearly in the height direction. This angle may be less than 30 degrees, or may be less than 20 degrees.

The plurality of branch tubes 40 are provided in a manner to surround the circumference of the trunk tube 30 at least once. The plurality of branch tubes 40 may be arranged at approximately uniform intervals around the trunk tube 30 in the overhead view. As shown in FIGS. 1 and 2, in a case where the branch tubes 40 extend from two opposite side surfaces of the trunk tube 30, if the branch tubes 40 are formed on half the circumference of the trunk tube 30, the result is that the branch tubes 40 extending from the two opposite side surfaces are formed around the entire circumference of the trunk tube 30.

The plurality of branch tubes 40 may be formed in a spiral around the trunk tube 30. In this case, as shown in FIGS. 1 and 2, branch tubes 40 that are adjacent in the height direction are also adjacent in the overhead view. The rotational direction of this spiral may be the same as the circulation direction of the exhaust gas in the internal space of the reaction tower 10. In this way, the circulation of the exhaust gas inside the reaction tower 10 can be encouraged.

By encouraging the circulation, it is possible to further prevent the liquid that has absorbed the harmful substances from being emitted to the outside. The circulation direction of the exhaust gas is determined by the direction in which the exhaust gas introducing section 20 introduces the exhaust gas into the reaction tower 10. Alternatively, the rotational direction of the spiral of the branch tubes 40 may be a direction opposite the circulation direction of the exhaust gas. In this case as well, it is possible to prevent the exhaust gas from progressing linearly in the height direction.

The cross-sectional area of the liquid flow path inside each of the plurality of branch tubes 40 may be different depending on the position of the branch tube 40 in the height direction. In the present example, the cross-sectional areas of the liquid flow paths of the branch tubes 40 in the top portion 36, which is farthest on the top portion side, are smaller than the cross-sectional areas of the liquid flow paths of the branch tubes 40 in the bottom portion 32, which is farthest on the bottom portion side.

In the present example, the cross-sectional areas of the liquid flow paths of the branch tubes 40 in the middle portion 34 are smaller than the cross-sectional areas of the liquid flow paths of the branch tubes 40 in the bottom portion 32. Furthermore, the cross-sectional areas of the liquid flow paths of the branch tubes 40 in the top portion 36 are even smaller than the cross-sectional areas of the liquid flow paths of the branch tubes 40 in the middle portion 34. In this way, it is possible make the decrease of liquid pressure inside each branch tube 40 smaller, thereby making the decrease of the ejection speed of the liquid smaller.

As shown in FIG. 1, the intervals between the plurality of branch tubes 40 in the height direction are smaller on the top portion side of the reaction tower 10 than on the bottom portion side of the reaction tower 10. For example, for each portion in which the cross-sectional area of the liquid flow path of the trunk tube 30 is changed, the intervals between the branch tubes 40 are also changed. In the present example, the intervals between the branch tubes 40 in the middle portion 34 are smaller than the intervals between the branch tubes 40 in the bottom portion 32. Furthermore, the intervals between the branch tubes 40 in the top portion 36 are even smaller than the intervals between the branch tubes 40 in the middle portion 34. In this way, by arranging the branch tubes 40 tightly near the exhaust section 12, it is possible to further prevent the liquid from being emitted from the exhaust section 12.

Since the bottom portion side of the reaction tower 10 is close to the exhaust gas introducing section 20, the circulation force of the exhaust gas is higher in this region than in the top portion side. Therefore, by arranging the branch tubes 40 on the bottom portion side of the reaction tower 10 relatively sparsely, it is possible to prevent the circulation of the exhaust gas from being impeded.

The particle diameter of the liquid ejected by the ejecting section 42 may be smaller on the top portion side of the reaction tower 10 than on the bottom portion side of the reaction tower 10. It should be noted that the number of particles of the liquid ejected per unit volume is higher on the top portion side of the reaction tower 10 than on the bottom portion side of the reaction tower 10.

Since the concentration of harmful substances included per unit volume is lower in the top portion of the reaction tower 10, the harmful substances can be absorbed more efficiently by arranging a large number of dispersed liquid particles with small particle diameters than by arranging liquid particles with large particle diameters sparsely. The liquid absorbs the harmful substances that are near the liquid.

If the concentration of the harmful substances is high, even when liquid particles with large particle diameters are arranged sparsely, the harmful substances near the liquid are absorbed, and these harmful substances can be absorbed until the liquid reaches a nearly saturated state. On the other hand, if the concentration of harmful substances is low, even when liquid particles with large particle diameters are arranged sparsely, the harmful substances cannot be absorbed until the liquid is in a nearly saturated state, and therefore the liquid cannot be used efficiently. In contrast to this, by arranging liquid particles with small particle diameters densely, even when the concentration of harmful substances is low, the harmful substances can be absorbed until the liquid is in a nearly saturated state, and therefore the liquid can be used efficiently.

The ejection regions 43 shown in FIG. 3 may be regions where the liquid is ejected by the ejecting sections 42 when the flow rate of the liquid supplied to the reaction tower 10 is a rated flow rate. In this case, the flow rate of the exhaust gas supplied to the reaction tower 10 may also be a rated flow rate. Furthermore, in a case where the rated flow rate of the liquid or the like supplied to the reaction tower 10 is not determined, a central value between an upper limit and a lower limit of the operable range of the exhaust gas processing apparatus 100 may be set as the rated flow rate. The operable range may be determined by the specifications of the exhaust gas processing apparatus 100. Furthermore, in a case where the operating specifications of the exhaust gas processing apparatus 100 are not determined, the ejection regions 43 may be determined from the shapes of the ejection openings of the ejecting sections 42.

Figure 4A:
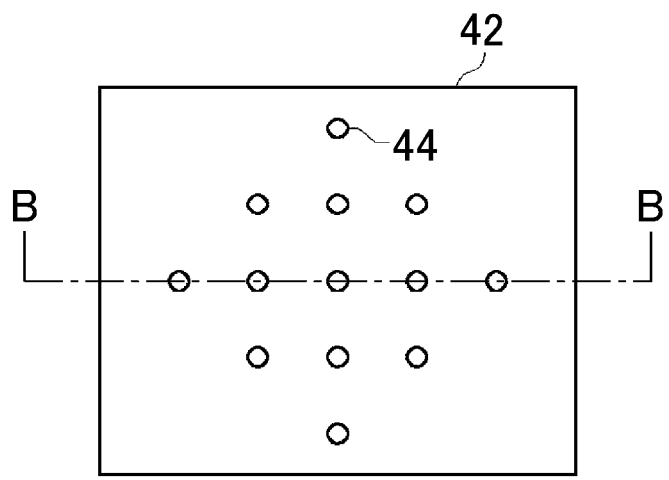
FIG. 4A shows the surface of the ejecting section 42 in which the ejection openings 44 are provided.
Figure 4B:
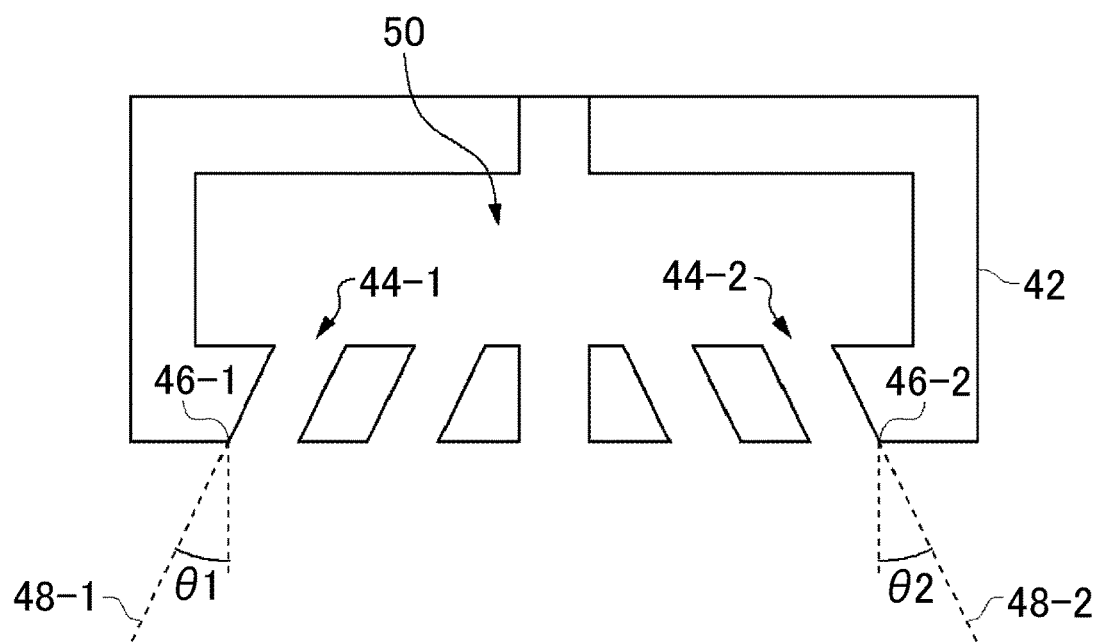
FIG. 4B shows the B-B cross section from FIG. 4A.

FIGS. 4A and 4B show an example of an ejecting section 42. FIG. 4A shows the surface of the ejecting section 42 in which the ejection openings 44 are provided, and FIG. 4B shows the B-B cross section from FIG. 4A. As shown in FIGS. 4A and 4B, the ejecting section 42 in the present example includes a plurality of ejection openings 44-1, 44-2 (collectively 44) and a liquid supplying section 50. The liquid supplying section 50 is provided in common for the plurality of ejection openings 44, and supplies the liquid to each ejection opening 44. The liquid is supplied from the branch tube 40 to the liquid supplying section 50.

As shown in FIG. 4B, each ejection opening 44 has one end 46 that opens toward the inside of the reaction tower 10 and another end that is connected to the liquid supplying section 50. At least one ejection opening 44 has a straight line 48-1, 48-2 (collectively 48) connecting the ends thereof that has a slope (e.g. θ1 and θ2 in FIG. 4B) relative to the surface of the ejecting section 42. The region defined by extending the straight lines 48-1 and 48-2 of the two ejection openings 44-1 and 44-2 provided at respective ends in the x-y plane may be the ejection region 43 described in FIG. 3.

Furthermore, the straight line 48 may have the slope of the ejection opening 44 at the end 46 of the ejection opening 44. For example, in a case where the slope of the ejection opening 44 changes from the liquid supplying section 50 to the end 46-1, 46-2 (collectively 46), the straight line 48 may be defined as the tangent at the end 46 of the ejection opening 44.

Figure 5A:
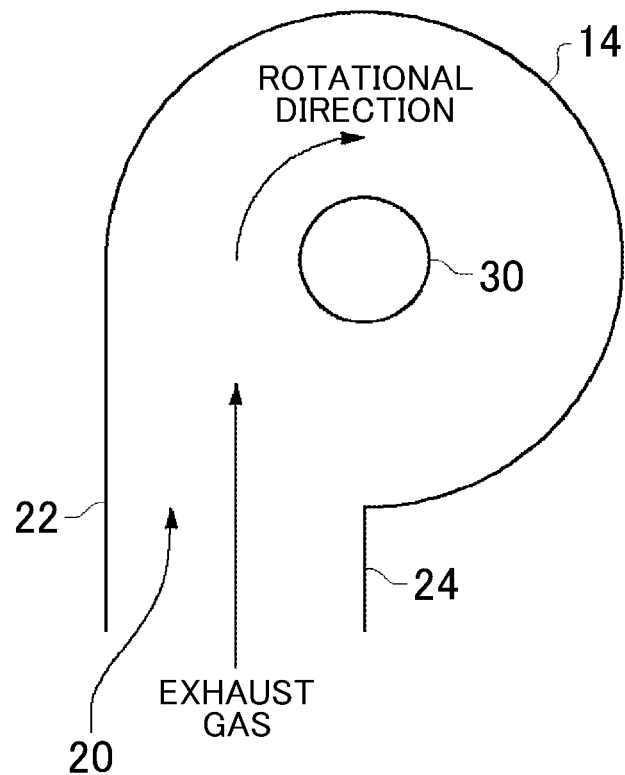
FIG. 5A is an overhead view of an exemplary connection between the reaction tower 10 and the exhaust gas introducing section 20.
Figure 5B:
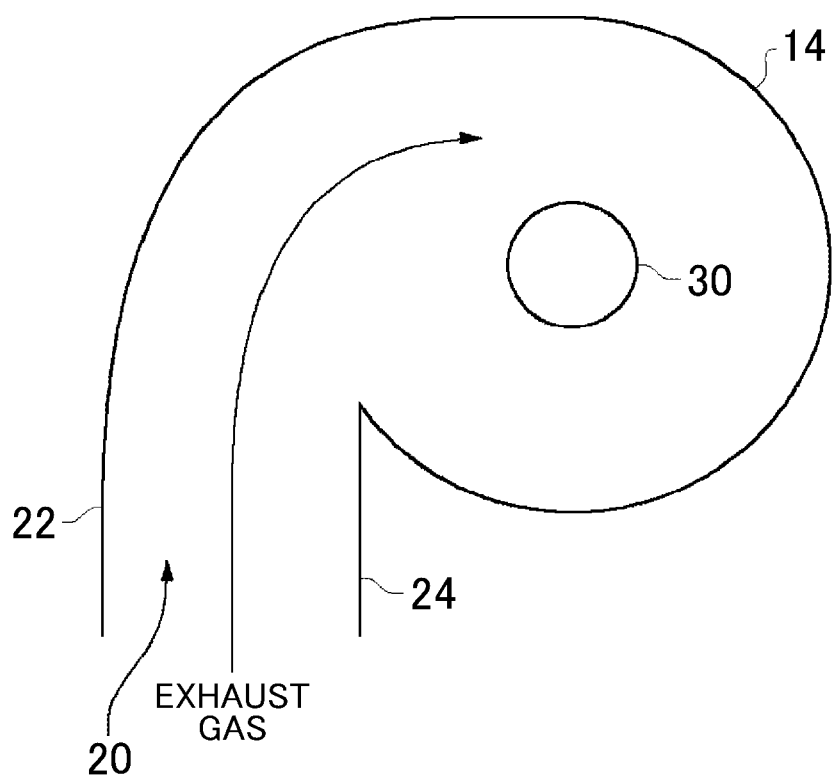
FIG. 5B is an overhead view of an exemplary connection between the reaction tower 10 and the exhaust gas introducing section 20.

FIGS. 5A and 5B are overhead views of an exemplary connection between the reaction tower 10 and the exhaust gas introducing section 20. In the example of FIG. 5A, the exhaust gas introducing section 20 is provided with a linear shape at the region near the connection portion for connecting to the reaction tower 10. It should be noted that the outer side wall 22 of the exhaust gas introducing section 20 extends in the direction of the tangent of the outer shape of the reaction tower 10, and the inner side wall 24 opposite the outer side wall 22 is provided in a manner to extend in a direction intersecting the outer shape of the reaction tower 10.

In the example of FIG. 5B, the exhaust gas introducing section 20 has a curved shape at the region near the connection portion for connecting to the reaction tower 10. In this case, the exhaust gas easily circulates within the reaction tower 10. In the example of FIG. 5A, the exhaust gas processing apparatus 100 can be miniaturized, but the circulation force of the exhaust gas introduced into the reaction tower 10 is lower than in the example of FIG. 5B. In this case as well, by arranging the branch tubes 40 in a spiral as described above, circulation of the exhaust gas can be supported. Accordingly, both miniaturization of the exhaust gas processing apparatus 100 and favorable circulation of the exhaust gas can be realized.

Figure 6:
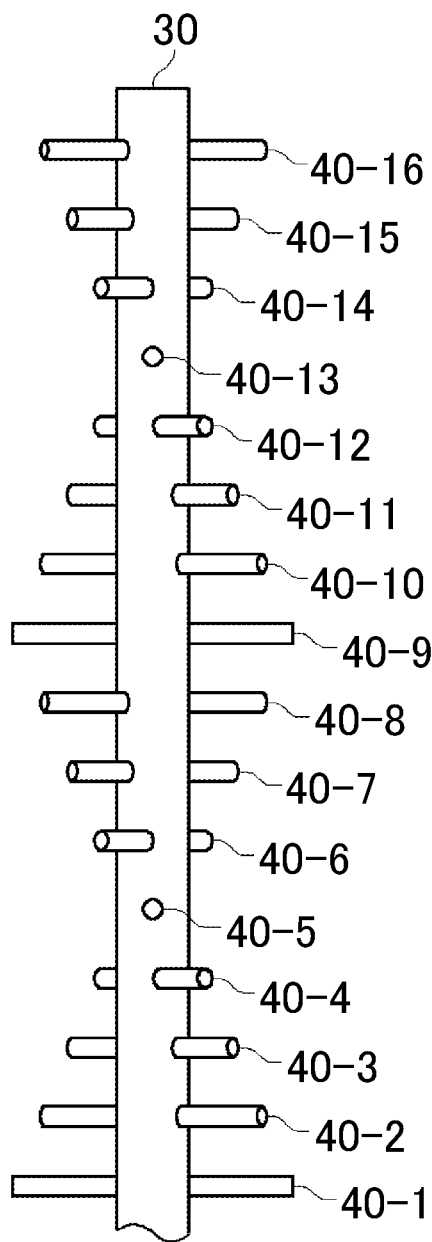
FIG. 6 shows another exemplary arrangement of the plurality of branch tubes 40.

FIG. 6 shows another exemplary arrangement of the plurality of branch tubes 40. FIG. 6 shows only the trunk tube 30 and the plurality of branch tubes 40, and other structures are omitted from the drawing. Furthermore, in FIG. 6, the thicknesses of the plurality of branch tubes 40 and intervals in the height direction between the plurality of branch tubes 40 are uniform, but as shown in FIG. 1, the branch tubes 40 on the top portion side may be thinner or the intervals between the branch tubes 40 on the top portion side may be smaller.

The plurality of branch tubes 40 in the present example are provided in a manner to surround the circumference of the trunk tube 30 once. Specifically, the branch tubes 40-1 to 40-8 are formed along half of the circumference of the trunk tube 30, and the branch tubes 40-9 to 40-16 are formed along the other half of the circumference of the trunk tube 30. In this case, the branch tubes 40 may be arranged such that none of the branch tubes 40 overlap in the overhead view, i.e. such that the angles relative to the trunk tube 30 do not overlap.

For example, the branch tubes 40-9 to 40-16 in the second set around the circumference are each arranged at the substantial center between two branch tubes 40 that are adjacent to each other among the branch tubes 40-1 to 40-8 in the first set around the circumference. More specifically, in a case where the angles between adjacent branch tubes 40 among the branch tubes 40-1 to 40-8 are 22.5 degrees, the branch tubes 40-9 to 40-16 are arranged with angles shifted by 11.25 degrees relative to the branch tubes 40-1 to 40-8.

The branch tubes 40-9 to 40-16 in the second set around the circumference may be arranged in a manner to overlap in the overhead view with the branch tubes 40-1 to 40-8 in the first set around the circumference. It should be noted that the interval in the height direction between two branch tubes 40 overlapping in the overhead view is preferably large enough to not impede the circulation of the exhaust gas. The interval in the height direction between two branch tubes 40 overlapping in the overhead view may be greater than or equal to 0.5 m, or may be greater than or equal to 2 m. Three or more branch tubes 40 may be provided in the height direction between two branch tubes 40 overlapping in the overhead view, or seven or more branch tubes 40 may be provided in the height direction between two branch tubes 40 overlapping in the overhead view.

Figure 7:
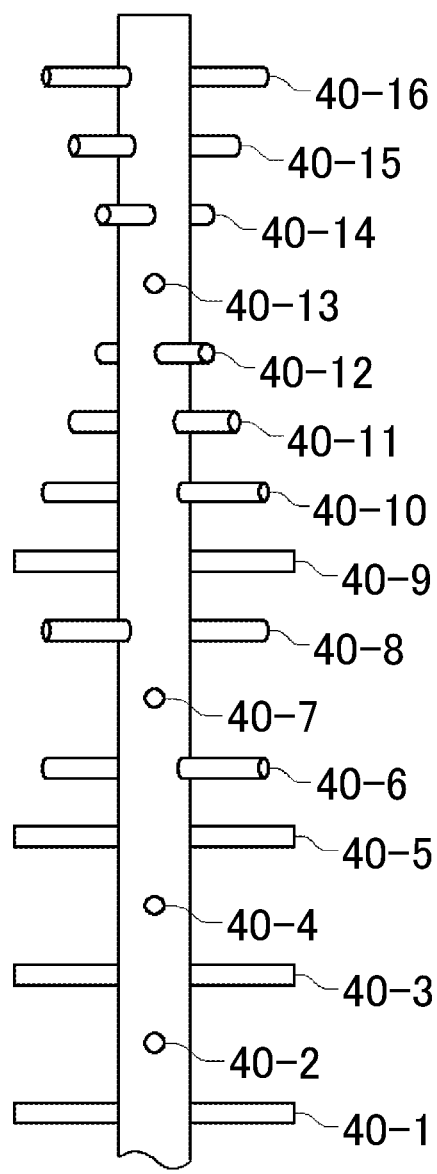
FIG. 7 shows another exemplary arrangement of the plurality of branch tubes 40.

FIG. 7 shows another exemplary arrangement of the plurality of branch tubes 40. FIG. 7 shows only the trunk tube 30 and the plurality of branch tubes 40, and other structures are omitted from the drawing. Furthermore, in FIG. 7, the thicknesses of the plurality of branch tubes 40 and intervals in the height direction between the plurality of branch tubes 40 are uniform, but as shown in FIG. 1, the branch tubes 40 on the top portion side may be thinner or the intervals between the branch tubes 40 on the top portion side may be smaller.

Among the plurality of branch tubes 40 in the present example, the angles formed by branch tubes 40 that are adjacent in the height direction are smaller on the top portion side of the reaction tower 10 than on the bottom portion side of the reaction tower 10. In the example of FIG. 7, the angles between adjacent branch tubes 40 among the branch tubes 40-1 to 40-5 on the bottom portion side are 90 degrees. The angles between adjacent branch tubes 40 among the branch tubes 40-5 to 40-9 in the middle are 45 degrees. The angles between adjacent branch tubes 40 among the branch tubes 40-9 to 40-16 on the top portion side are 22.5 degrees.

In this way, by arranging the branch tubes 40 densely near the exhaust section 12, it is possible to further prevent the liquid from being emitted from the exhaust section 12. Furthermore, by arranging the branch tubes 40 relatively sparsely on the bottom portion side of the reaction tower 10, it is possible to prevent the circulation of the exhaust gas from being impeded.

The angles between adjacent branch tubes 40 may be changed for each set of branch tubes 40 around the circumference of the trunk tube 30. In this way, it is possible to arrange the branch tubes 40 uniformly in the overhead view. Furthermore, as shown in FIG. 1, the angles formed between adjacent branch tubes 40 may be changed for each of the plurality of portions in which the cross-sectional area of the liquid flow path of the trunk tube 30 is changed. In the example shown in FIG. 7 as well, the branch tubes 40 may be arranged such that none of the branch tubes 40 overlap in the overhead view.

Figure 8A:
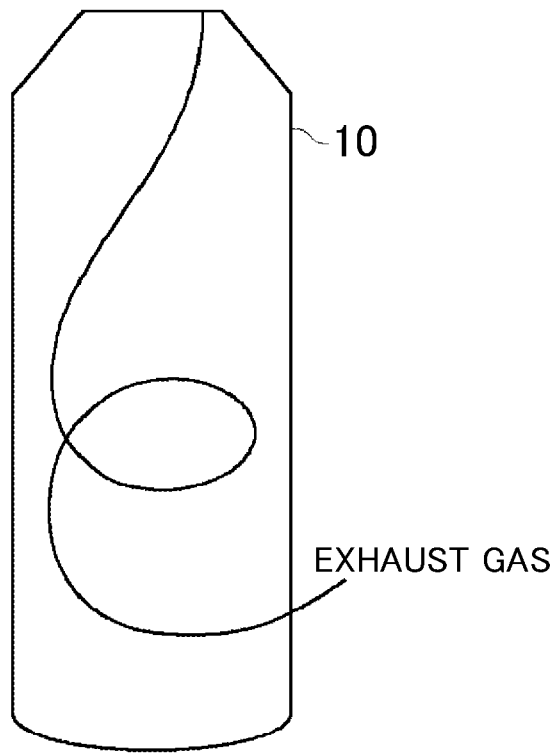
FIG. 8A shows an example of circulation of the exhaust gas in the reaction tower 10 when the angle between branch tubes 40 adjacent in the height direction is 90 degrees.
Figure 8B:
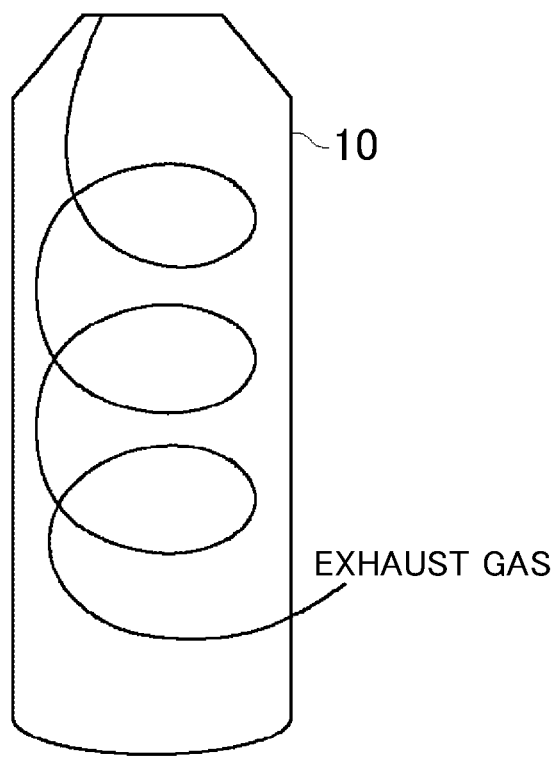
FIG. 8B shows an example of circulation of the exhaust gas in the reaction tower 10 when the angle between branch tubes 40 adjacent in the height direction is 22.5 degrees.

FIG. 8A shows an example of circulation of the exhaust gas in the reaction tower 10 when the angle between branch tubes 40 adjacent in the height direction is 90 degrees. FIG. 8B shows an example of circulation of the exhaust gas in the reaction tower 10 when the angle between branch tubes 40 adjacent in the height direction is 22.5 degrees. In FIGS. 8A and 8B, the flow routes of the exhaust gas were calculated using simulations in which all conditions other than the angles of the branch tubes 40, such as the size of the internal space of the reaction tower 10, the number of branch tubes 40, and the introduction speed of the exhaust gas, were the same. In FIGS. 8A and 8B, the flow route of the exhaust gas is shown being approximated as a single line, for easier viewing.

As shown in FIG. 8A, in the case where the angles between adjacent branch tubes 40 are 90 degrees, the exhaust gas is circulated approximately once in the reaction tower 10 and then emitted. In contrast, as shown in FIG. 8B, in the case where the angles between adjacent branch tubes 40 are 22.5 degrees, the exhaust gas is circulated approximately two to three times in the reaction tower 10 and then emitted. In this way, by setting the angles between adjacent branch tubes 40 to be less than 60 degrees, is it possible to increase the number of circulations of the exhaust gas in the reaction tower 10.

Figure 9:
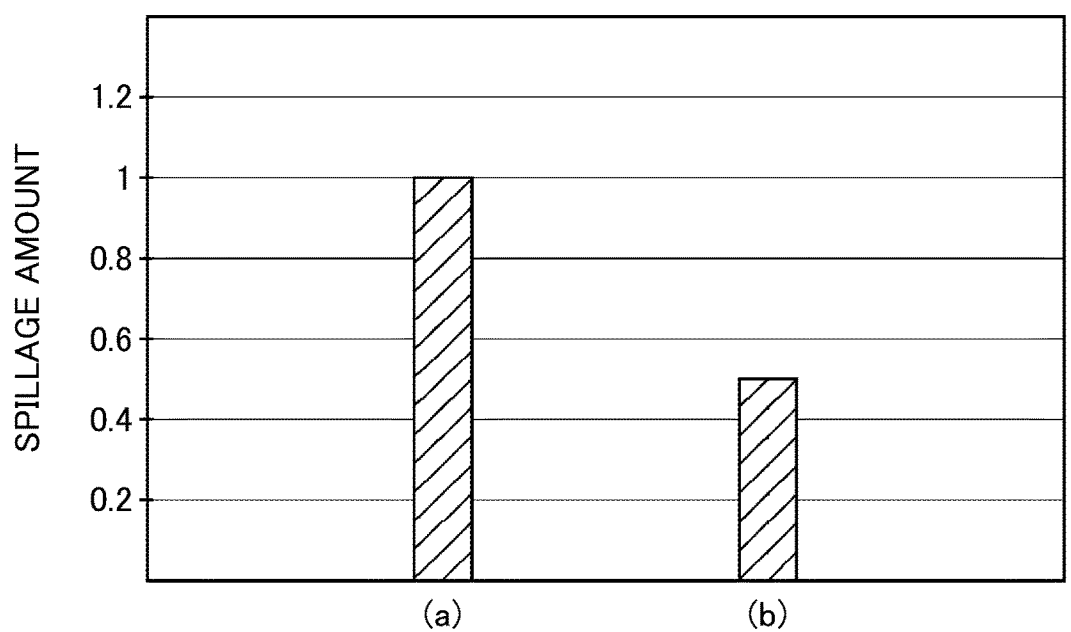
FIG. 9 shows analytical results of the amount of liquid spilled to the outside from the apparatus shown in FIG. 8A and the amount of liquid spilled to the outside from the apparatus shown in FIG. 8B.

FIG. 9 shows analytical results of the amount of liquid spilled to the outside from the apparatus shown in FIG. 8A (graph (a)) and the amount of liquid spilled to the outside from the apparatus shown in FIG. 8B (graph (b)). In FIG. 9, the liquid spillage amount for the liquid spilled from the apparatus shown in FIG. 8A is set to 1. In the example of FIG. 8B, the liquid spillage amount is reduced to approximately half. This is believed to be due to the increase in the number of circulations of the exhaust gas, as shown in FIG. 8B.

For example, by increasing the number of circulations of the exhaust gas, the probability of the liquid attaching to the inner wall of the reaction tower 10 along with the flow of the exhaust gas increases. In particular, as shown in FIG. 8B, circulation of the exhaust gas is maintained even on the top portion side of the reaction tower 10, where it is easy for the liquid to spill to the outside. Therefore, the liquid spillage amount can be reduced.

Figure 10:
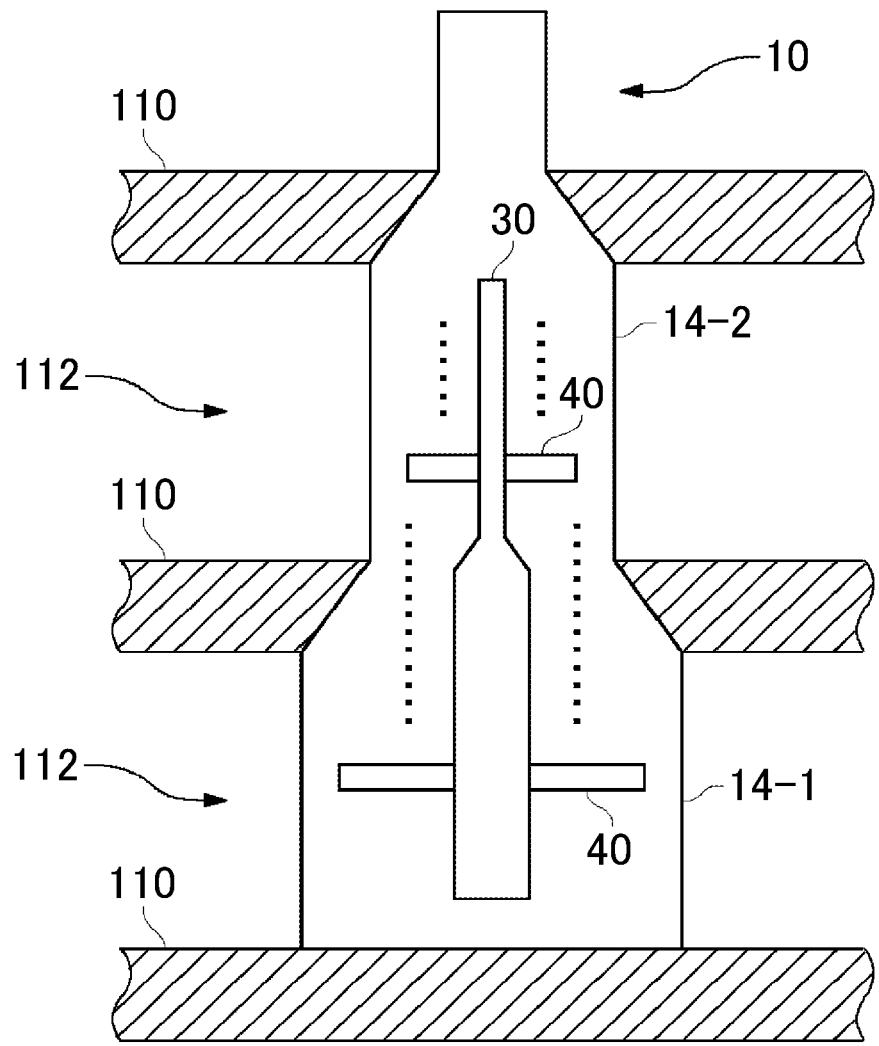
FIG. 10 shows an exemplary reaction tower 10 of the exhaust gas processing apparatus 100 installed in a ship.

FIG. 10 shows an exemplary reaction tower 10 of the exhaust gas processing apparatus 100 installed in a ship. The exhaust gas processing apparatus 100 in the present example processes the exhaust gas from a drive source of the ship. The ship has a plurality of floors 112 in the height direction. The floors 112 are divided by floor boards 110.

The reaction tower 10 is provided across two or more floors 112 of the ship. The floor boards 110 include openings through which the reaction tower 10 passes. The cross-sectional area of the internal space of the reaction tower 10 in a plane perpendicular to the height direction may be different in every floor 112 of the ship. The outer shape of the reaction tower 10 also changes according to the cross-sectional area. In the present example, the outer shape and the cross-sectional area 14-1, 14-2 of the internal space of the reaction tower 10 are smaller in higher floors 112. By making the cross-sectional area of the reaction tower 10 smaller on the top portion side, the circulation radius of the exhaust gas can be made smaller and a decrease in the number of circulations can be prevented. Furthermore, since the outer shape of the reaction tower 10 can be made small, the reaction tower 10 can be installed easily even in a ship where the installation space is limited.

The extension length in the x-y plane of each branch tube 40 provided in each floor 112 differs according to the cross-sectional area of the internal space of the reaction tower 10. In other words, the extension length of a branch tube 40 is shorter when the cross-sectional area of the internal space in the floor 112 where the branch tube 40 is arranged is smaller.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

LIST OF REFERENCE NUMERALS

10: reaction tower, 12: exhaust section, 14: absorbing section, 20: exhaust gas introducing section, 22: outer side wall, 24: inner side wall, 30: trunk tube, 32: bottom portion, 34: middle portion, 36: top portion, 40: branch tube, 42: ejecting section, 43: ejection region, 44: ejection opening, 46: end, 48: straight line, 50: liquid supplying section, 100: exhaust gas processing apparatus, 110: floor board, 112: floor

What is claimed is:
1. An exhaust gas processing apparatus that processes exhaust gas, comprising:
a reaction tower that includes an internal space extending in a height direction from a bottom portion where the exhaust gas is introduced to a top portion where the exhaust gas is emitted;
a trunk tube that extends in the height direction in the internal space of the reaction tower and transports a liquid;
at least three branch tubes that are provided extending from an outer side surface of the trunk tube toward an inner side surface of the reaction tower, each of the at least three branch tubes including an ejecting section that ejects the liquid supplied from the trunk tube, and are provided at positions at different heights; and an exhaust gas introducing section that causes the exhaust gas to be introduced into the reaction tower in a manner to circulate the exhaust gas, wherein ejection regions of the liquid where the liquid is ejected from respective ejecting sections of branch tubes that are adjacent in the height direction each include a region in which the ejection regions partially overlap in an overhead view as seen from the height direction, among the at least three branch tubes, angles formed between branch tubes that are adjacent in the height direction are smaller in the top portion of the reaction tower where the exhaust gas is emitted than in the bottom portion of the reaction tower where the exhaust gas is introduced, and the ejection regions of each of the at least three branch tubes overlap in the overhead view respective ejection regions of two or more other ones of the at least three branch tubes.

2. The exhaust gas processing apparatus according to claim 1, wherein a cross-sectional area of a flow path of the liquid in the trunk tube in the top portion of the reaction tower where the exhaust gas is emitted is less than a cross-sectional area of a flow path of the liquid in the trunk tube in the bottom portion of the reaction tower where the exhaust gas is introduced.

3. The exhaust gas processing apparatus according to claim 1, wherein in the overhead view of the plurality of branch tubes as seen from the height direction, a largest angle among angles formed by adjacent branch tubes is less than 60 degrees.

4. The exhaust gas processing apparatus according to claim 1, wherein in the overhead view, the plurality of branch tubes are provided in a manner to surround a circumference of the trunk tube at least once.

5. The exhaust gas processing apparatus according to claim 4, wherein in the overhead view, the plurality of branch tubes are provided in a manner to surround a circumference of the trunk tube at least twice, and in the overhead view, the branch tubes in the second set around the circumference are arranged respectively at a middle point between two adjacent branch tubes among the branch tubes in a first set around the circumference.

6. The exhaust gas processing apparatus according to claim 1, wherein intervals between the plurality of branch tubes in the height direction are denser in a top portion of the reaction tower where the exhaust gas is emitted than in a bottom portion of the reaction tower where the exhaust gas is introduced.

7. The exhaust gas processing apparatus according to claim 1, wherein the plurality of branch tubes are provided in a spiral having a rotational direction that is the same as a circulation direction of the exhaust gas introduced to the reaction tower.

8. The exhaust gas processing apparatus according to claim 1, wherein the plurality of branch tubes are provided in a spiral having a rotational direction that is opposite of a circulation direction of the exhaust gas introduced to the reaction tower.

9. The exhaust gas processing apparatus according to claim 7, wherein the plurality of branch tubes are provided in a manner to not overlap in the overhead view.

10. The exhaust gas processing apparatus according to claim 8, wherein the plurality of branch tubes are provided in a manner to not overlap in the overhead view.

11. The exhaust gas processing apparatus according to claim 1, wherein the ejecting sections are provided in the branch tubes and particle diameters of liquid particles ejected by the ejecting sections are smaller in a top portion of the reaction tower where the exhaust gas is emitted than in a bottom portion of the reaction tower where the exhaust gas is introduced.

12. The exhaust gas processing apparatus according to claim 1, wherein a number of particles in the ejected liquid per unit volume is greater in the top portion of the reaction tower where the exhaust gas is emitted than in the bottom portion of the reaction tower where the exhaust gas is introduced.

13. The exhaust gas processing apparatus according to claim 1, wherein the exhaust gas processing apparatus is configured for installation in a ship.

14. The exhaust gas processing apparatus according to claim 13, wherein the ship includes a plurality of floors in a height direction, the reaction tower is provided across two or more floors of the ship, and a cross-sectional area of the internal space of the reaction tower in a plane perpendicular to the height direction differs according to the floor of the ship.

15. The exhaust gas processing apparatus according to claim 14, wherein extension lengths of the branch tubes provided in respective floors differ according to the respective cross-sectional area of the internal space.

* * * * *